(12) United States Patent
Lacey et al.

(10) Patent No.: US 10,590,872 B2
(45) Date of Patent: Mar. 17, 2020

(54) CYLINDER EXHAUST GAS RECIRCULATION DISTRIBUTION MEASUREMENT SYSTEMS AND METHODS

(71) Applicant: Ford Global Technologies, LLC, Dearborn, MI (US)

(72) Inventors: Tyler Lacey, Wallbridge, OH (US); Shawn Spannbauer, Royal Oak, MI (US); Norman Opolsky, West Bloomfield, MI (US); Chad Stateler, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 15/895,708

(22) Filed: Feb. 13, 2018

(65) Prior Publication Data

US 2019/0249612 A1 Aug. 15, 2019

(51) Int. Cl.
*F02D 41/00* (2006.01)
*F02M 26/47* (2016.01)
(Continued)

(52) U.S. Cl.
CPC ......... *F02D 41/0072* (2013.01); *F02M 26/09* (2016.02); *F02M 26/23* (2016.02);
(Continued)

(58) Field of Classification Search
CPC ......... F02D 41/0072; F02D 2041/0067; F02D 2041/0075; F02M 35/10222; F02M 26/09;
(Continued)

(56) References Cited

U.S. PATENT DOCUMENTS 4,440,120 A * 4/1984 Butler ............... F02B 75/22
123/184.34
5,419,301 A 5/1995 Schechter
(Continued)

FOREIGN PATENT DOCUMENTS

JP 58072664 A * 4/1983 ......... F02D 41/0077
JP 58072665 A * 4/1983 ......... F02D 41/0052
(Continued)

OTHER PUBLICATIONS

"ECM EGER 5230: Exhaust Gas Recirculation (EGR), Lambda, AFR, and O2 Analyzer," ECM: Engine Control and Monitoring Product Brochure, Available Online at http://www.ecm-co.com/download.asp?15040, Nov. 12, 2014, 2 pages.

*Primary Examiner* — Joseph J Dallo
(74) *Attorney, Agent, or Firm* — Geoffrey Brumbaugh McCoy Russell LLP

(57) ABSTRACT

Methods and systems are provided for measuring exhaust gas recirculation (EGR) distribution among individual engine cylinders. In one example, a method may include fluidly coupling a plurality of intake runners of an engine to a vacuum pump, diverting a portion of intake charge gas from the intake runner to a gas composition sensor with the vacuum pump, measuring an oxygen concentration of the diverted intake charge portion with the gas composition sensor, and estimating an EGR concentration of the intake charge based on the measured oxygen concentration.

20 Claims, 8 Drawing Sheets

(51) Int. Cl.
*F02M 26/23* (2016.01)
*F02M 26/09* (2016.01)
*F02M 35/10* (2006.01)
*F02M 26/00* (2016.01)
*F02M 26/06* (2016.01)
*F02M 26/05* (2016.01)

(52) U.S. Cl.
CPC ...... *F02M 26/47* (2016.02); *F02M 35/10222* (2013.01); *F02D 2041/0067* (2013.01); *F02D 2041/0075* (2013.01); *F02M 26/05* (2016.02); *F02M 26/06* (2016.02); *F02M 2026/003* (2016.02)

(58) Field of Classification Search
CPC ........ F02M 26/23; F02M 26/47; F02M 26/05; F02M 26/06; F02M 2026/003
See application file for complete search history.

(56) References Cited

U.S. PATENT DOCUMENTS

| | | |
|---|---|---|
| 5,651,353 A | 7/1997 | Allston |
| 8,622,045 B2 | 1/2014 | Chapman et al. |
| 2012/0024261 A1* | 2/2012 | Ulrey .............. F02D 11/02 123/336 |
| 2013/0026817 A1 | 1/2013 | Morishita et al. |
| 2013/0319381 A1* | 12/2013 | Arvizu Dal Piaz ........... F02M 35/10072 123/568.11 |

FOREIGN PATENT DOCUMENTS

| | | | |
|---|---|---|---|
| JP | 59120770 A | * 7/1984 | ............ F02M 26/46 |
| JP | 02283848 A | * 11/1990 | |
| JP | 02283849 A | * 11/1990 | |
| JP | 06207560 A | * 7/1994 | |
| JP | 10176577 A | * 6/1998 | |

* cited by examiner

CYLINDER EXHAUST GAS RECIRCULATION DISTRIBUTION MEASUREMENT SYSTEMS AND METHODS

FIELD

The present description relates generally to methods and systems measuring exhaust gas recirculation distribution among individual engine cylinders.

BACKGROUND/SUMMARY

Combustion engines employ exhaust gas recirculation (EGR) to reduce NOx emissions, which are generated in larger quantities at higher peak engine combustion temperatures. Recirculating exhaust gas to the engine intake lowers peak engine combustion temperatures by diluting the oxygen concentrations, which lowers combustion rates, and also by providing additional heat capacity for absorbing heat generated from engine combustion. However, higher in-cylinder peak temperatures and higher NOx emissions can be generated in an engine when the EGR distribution among each of an engine's cylinders is non-uniform. Typical EGR distribution measurement systems measure intake gas from a single cylinder intake with a gas analyzer for determining the EGR distribution in that cylinder. In order to characterize the EGR distribution among all individual engine cylinders, the single-cylinder measurement is for each individual engine cylinder and engine operating condition, with each cylinder being sampled over a range of engine operating conditions, including EGR valve set points for each engine running state.

The inventors herein have recognized potential issues with such systems. First, because conventional measurement of cylinder EGR distribution is performed on an individual cylinder-by-cylinder basis, the testing process can be lengthy, even when considering a lone engine running state set point. Furthermore, because a conventional gas analyzer instrument is used, intake gas must flow from the engine to the gas analysis chamber within the gas analyzer positioned external to and at a distance from the engine. Typically, the sample gas must flow through a tortuous path within the gas analyzer instrument before reaching the sample chamber within. As such, delays in gas transport from the engine to the gas analyzer and delays in analysis time can be significant and can severely lower the speed and efficiency of the measurement system. As such, development and validation of EGR systems can be laborious and costly, sometimes involving months of active testing and measurement with extensive equipment auxiliary to the engine.

In one example, the issues described above may be at least partially addressed by a method comprising fluidly coupling an intake runner of an engine to a vacuum pump, diverting a portion of intake charge gas from the intake runner to a gas composition sensor with the vacuum pump, measuring an oxygen concentration of the diverted intake charge portion with the gas composition sensor, and estimating an EGR concentration of the intake charge based on the measured oxygen concentration. In this way, the vacuum pump actively draws the intake charge gas to the gas composition sensor, thereby reducing transport delays for sampling gas from the cylinder intake runners to the gas composition sensors. As one example, the method may further comprise fluidly coupling a plurality of intake runners of the engine to the vacuum pump, each of the intake runners fluidly coupled to a separate engine combustion cylinder. In this way, the vacuum pump may sample from a plurality of cylinder intake runners, thereby reducing a testing time for development and validation of an EGR system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
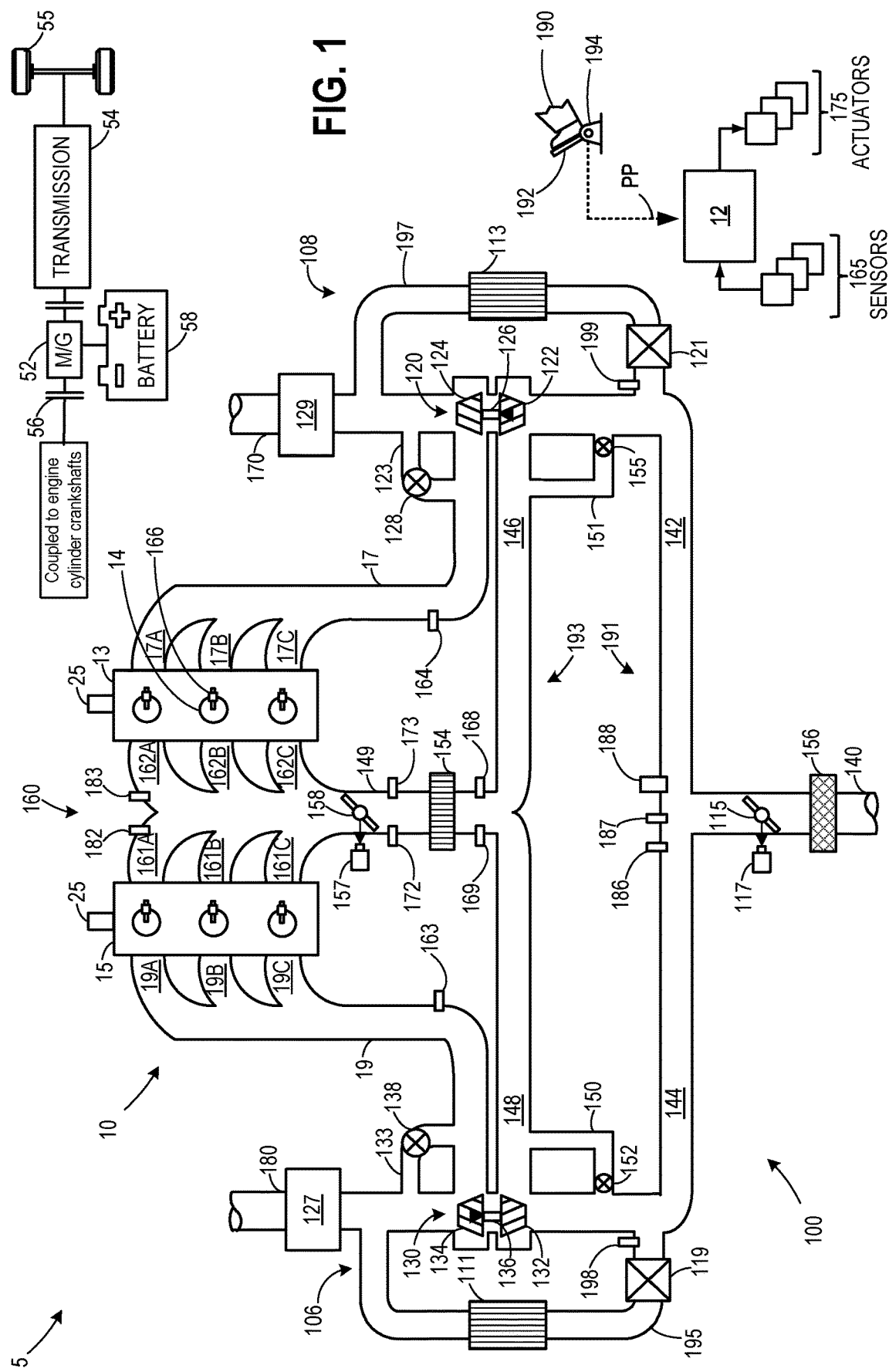
FIG. 1 shows a schematic depiction of an example engine system.
Figure 2:
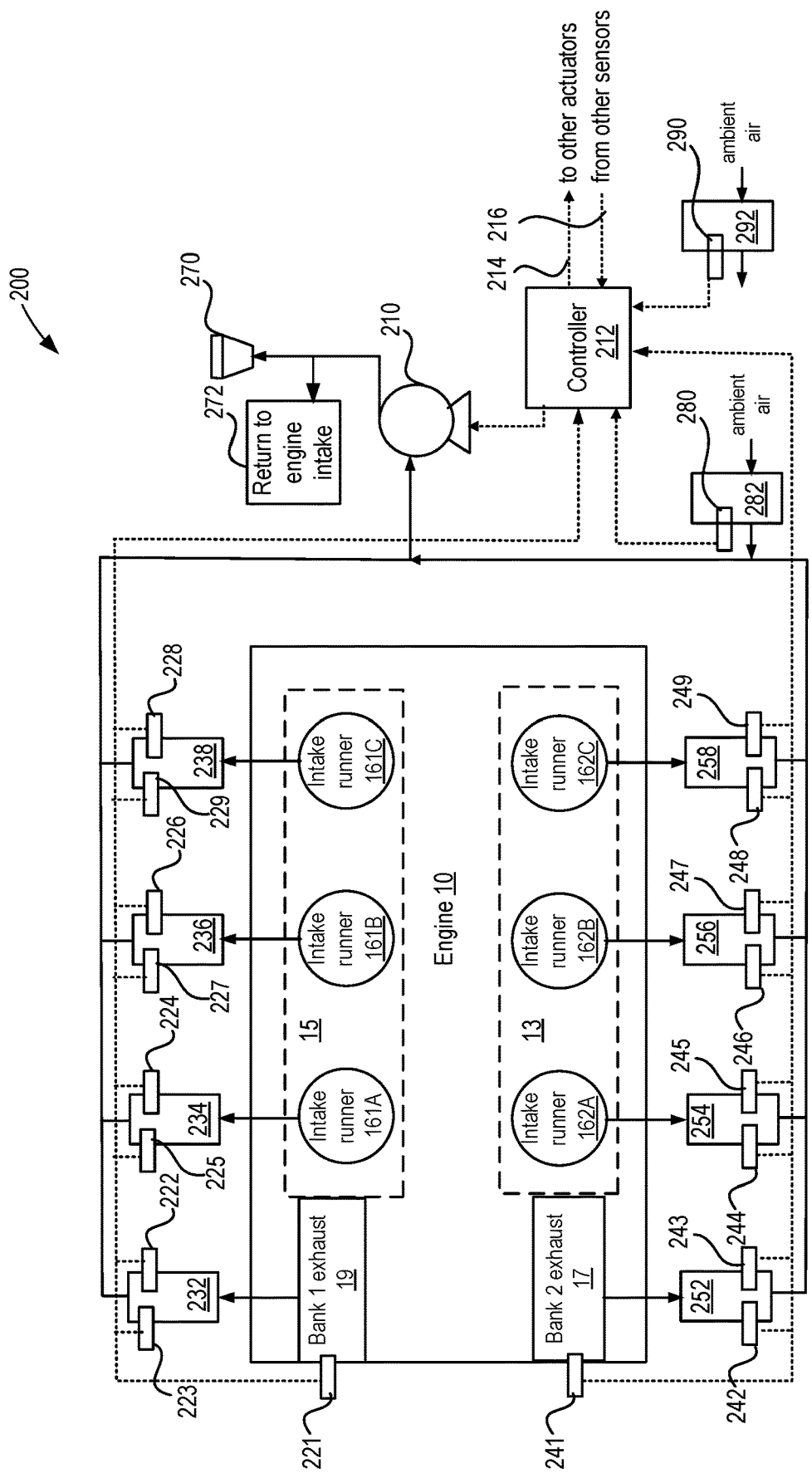
FIG. 2 shows a schematic depiction of a cylinder exhaust gas recirculation (EGR) distribution measurement system for the engine of FIG. 1.
Figure 3:
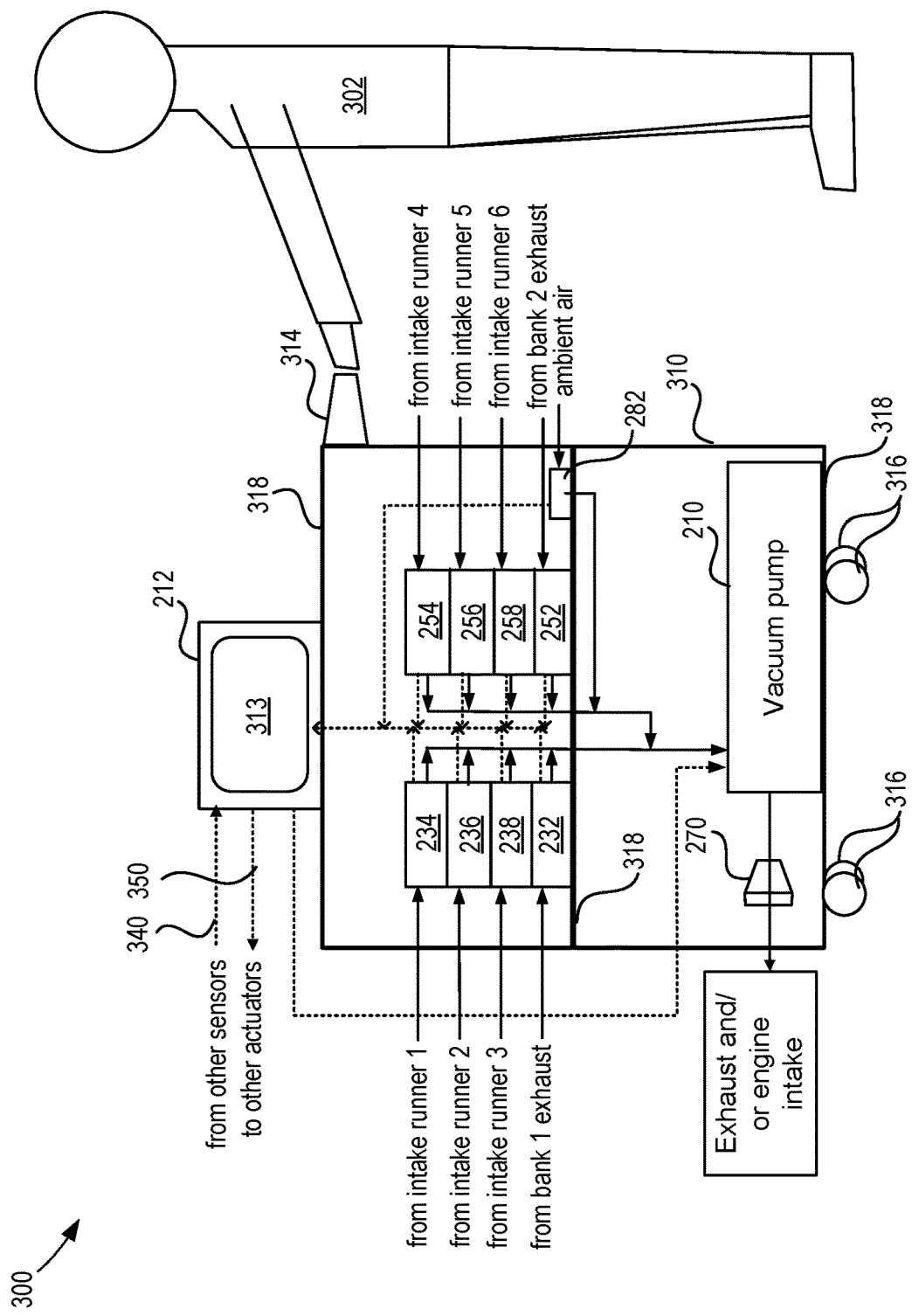
FIG. 3 shows a schematic depiction of a mobile cylinder EGR distribution measurement system for the engine of FIG. 1.
Figure 4:
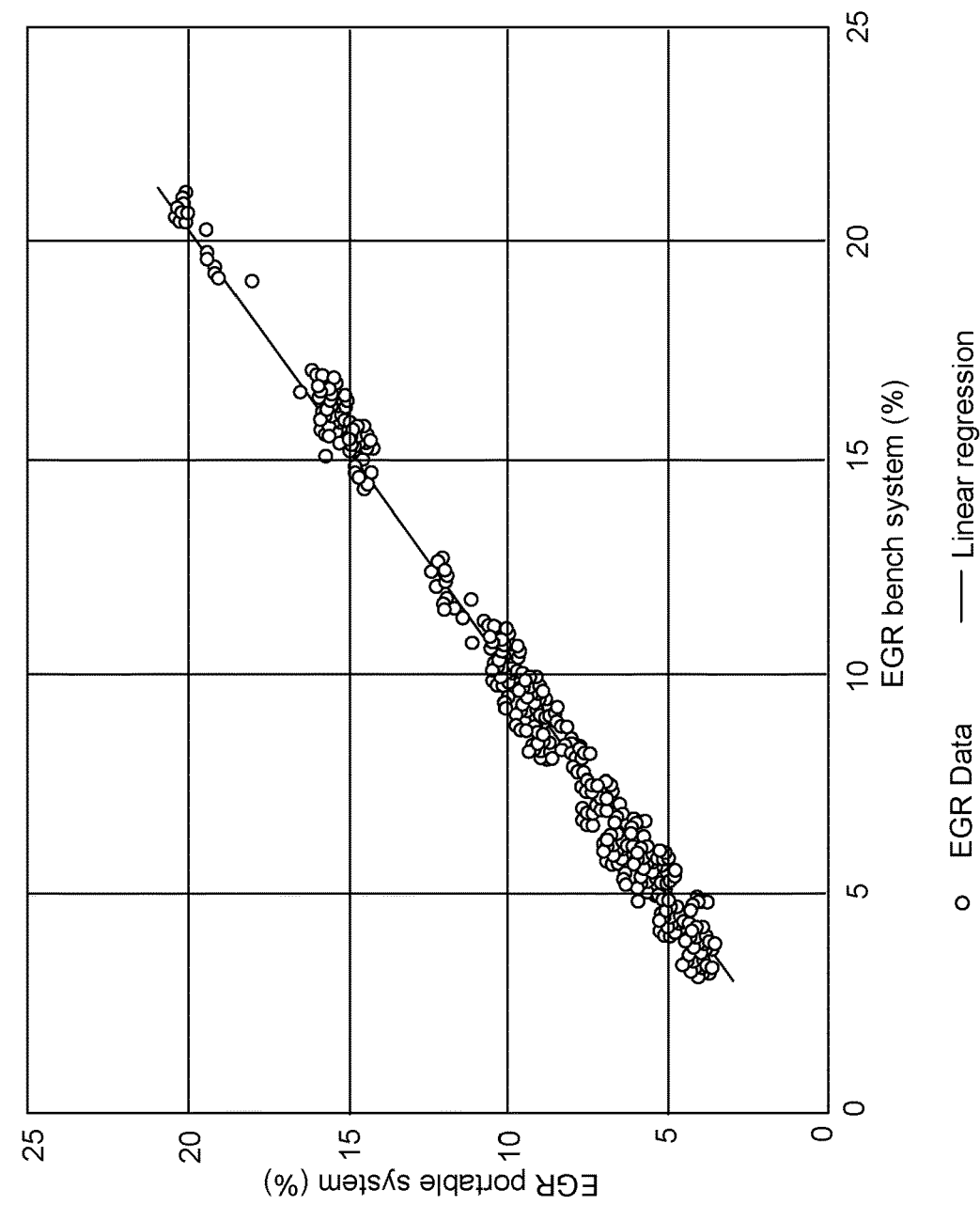
FIGS. 4-7 show data plots characterizing the performance of the cylinder EGR distribution measurement systems of FIGS. 2 and 3.
Figure 5:
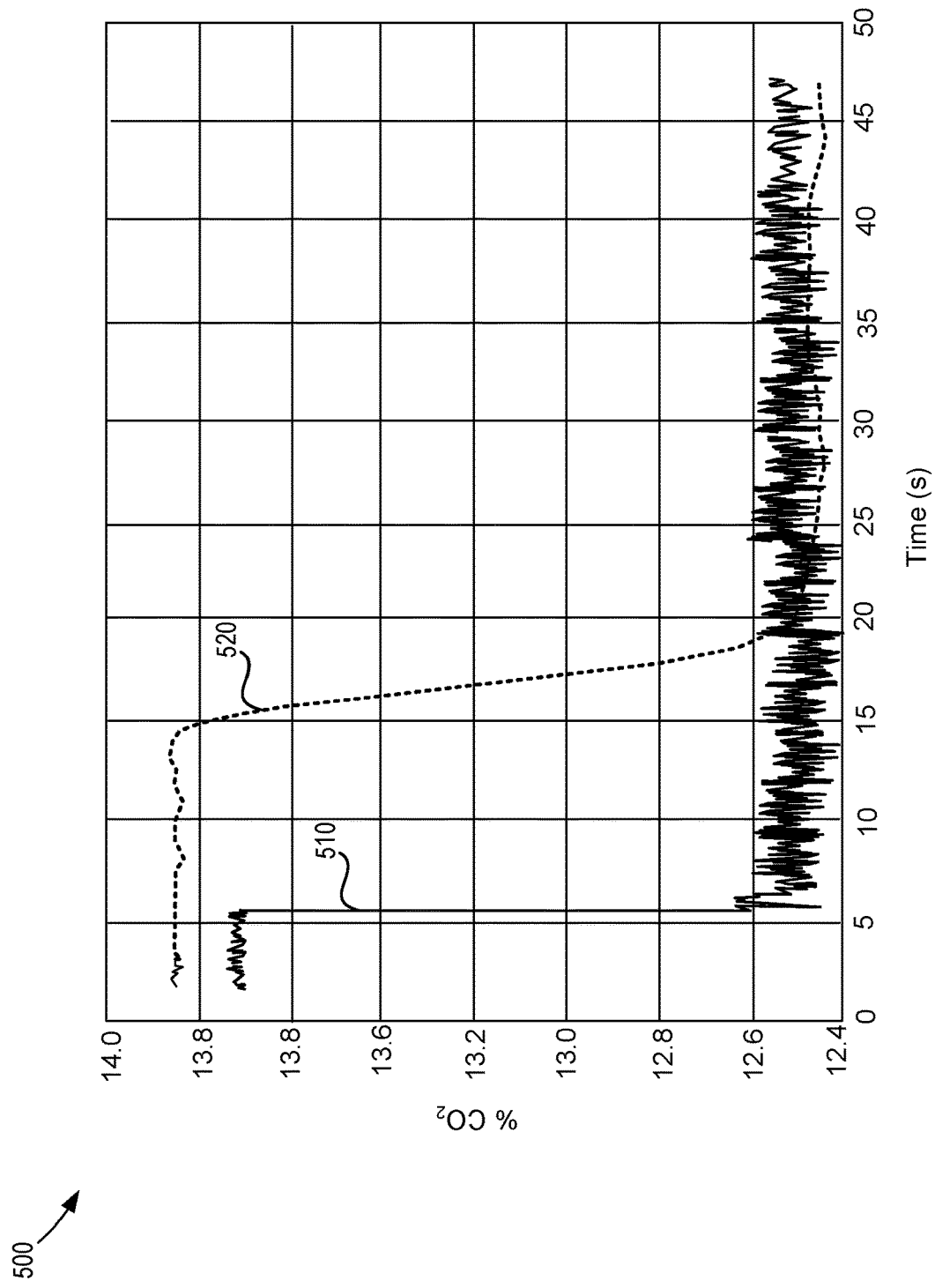

The following description relates to systems and methods for a cylinder exhaust gas recirculation (EGR) distribution system. An engine system, as shown in FIG. 1, may include one or more EGR systems. As depicted in FIG. 2, the cylinder EGR distribution may be measured by fluidly coupling a cylinder EGR distribution measurement system to the engine system of FIG. 1. In one embodiment, the cylinder EGR distribution measurement system of FIG. 2 may include a mobile and/or portable cylinder EGR distribution measurement system, as shown in FIG. 3. The cylinder EGR distribution measurement system of FIGS. 2 and 3 may have increased performance relative to conventional EGR measurement systems, as shown in FIGS. 4-7. Furthermore, a method of measuring cylinder EGR distribution utilizing the cylinder EGR distribution measurement systems of FIGS. 2 and 3 is depicted in FIG. 8.

Turning now to FIG. 1, it shows a schematic depiction of an example vehicle system 5 with an engine system 100 including a multi-cylinder internal combustion engine 10 with multiple banks 13 and 15 of engine cylinders. In the example of FIG. 1, the engine system 100 includes twin turbochargers 120 and 130, which may be identical. As one non-limiting example, engine system 100 can be included as part of a propulsion system for a passenger vehicle or other vehicle. While not depicted herein, other engine configurations such as an engine with a single turbocharger or without a turbocharger may be used without departing from the scope of this disclosure.

In some examples, the vehicle system 5 including engine system 100 may be a hybrid vehicle with multiple sources of torque available to one or more vehicle wheels 55. In other examples, vehicle system 5 is a conventional vehicle with only an engine 10, or an electric vehicle with only electric machine(s). In the example shown, vehicle system 5 includes engine 10 and an electric machine 52. Electric machine 52 may be a motor or a motor/generator. Crankshaft (not shown) of engine 10 and electric machine 52 are connected via a transmission 54 to vehicle wheels 55 when one or more clutches 56 are engaged. In the depicted example, a first clutch 56 is provided between the engine crankshaft and electric machine 52, and a second clutch 56 is provided between electric machine 52 and transmission 54. Controller 12 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle. Electric machine 52 receives electrical power from a traction battery 58 to provide torque to vehicle wheels 55. Electric machine 52 may also be operated as a generator to provide electrical power to charge battery 58, for example during a braking operation.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer on board a vehicle including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed. Controller 12 may be configured to receive information from a plurality of sensors 165 and to send control signals to a plurality of actuators 175 (various examples of which are described herein) to adjust engine operation based on the received signals and instructions stored on a memory of the controller. Other sensors, and actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described below and with regard to FIG. 8.

Engine system 100 may receive intake air via intake passage 140. As shown in FIG. 1, intake passage 140 may include an air filter 156 and an air induction system (AIS) throttle 115. AIS throttle 115 may be configured to adjust and control an amount of low pressure exhaust gas recirculation (LP EGR) flow. The position of AIS throttle 115 may be adjusted by the control system via a throttle actuator 117 communicatively coupled to controller 12.

At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144. Accordingly, engine system 100 includes a low-pressure AIS system 191 upstream of compressors 122 and 132, and a high-pressure AIS system 193 downstream of compressors 122 and 132.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. The intake manifold 160 may comprise a plurality of separate intake runners 161A-C and 162A-C, each of the separate intake runners corresponding to and fluidly coupled to a single cylinder in one of the cylinder banks of the engine. As shown in the example of FIG. 1, six separate intake runners are depicted for a six-cylinder engine; however in other examples, there may be more or fewer separate intake runners, depending on the number of individual cylinders in the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown in FIG. 1, a compressor recirculation valve (CRV) 152 may be arranged in CRV passage 150 and a CRV 155 may be arranged in CRV passage 151. In one example, CRVs 152 and 155 may be electronic pneumatic CRVs (EPCRVs). CRVs 152 and 155 may be controlled to enable release of pressure in the intake system when the engine is boosted. A first end of CRV passage 150 may be coupled with intake passage 144 upstream of compressor 132, and a second end of CRV passage 150 may be coupled with intake passage 148 downstream of compressor 132. Similarly, a first end of a CRV passage 151 may be coupled with intake passage 142 upstream of compressor 122, and second end of CRV passage 151 may be coupled with intake passage 146 downstream of compressor 122. Depending on a position of each CRV, air compressed by the corresponding compressor may be recirculated into the intake passage upstream of the compressor (e.g., intake passage 144 for compressor 132 and intake passage 142 for compressor 122). For example, CRV 152 may open to recirculate compressed air upstream of compressor 132 and/or CRV 155 may open to recirculate compressed air upstream of compressor 122 to release pressure in the intake system during selected conditions to reduce the effects of compressor surge loading. CRVs 155 and 152 may be passively controlled, or actively controlled by the control system.

As shown, a low-pressure (LP) AIS pressure sensor 186 is arranged at a juncture of intake passages 140, 142, and 144, and a high-pressure (HP) AIS pressure sensor 169 is arranged in intake passage 149. However, in other anticipated embodiments, sensors 186 and 169 may be arranged at other locations within the LP AIS and HP AIS, respectively. Among other functions, measurements from LP AIS pressure sensor 186 and HP AIS pressure sensor 169 may be used to determine compressor pressure ratio, which may in factor into an estimate of compressor surge risk.

Engine 10 may include a plurality of cylinders 14. Each of the cylinders may be formed by cylinder walls with a piston (not shown) positioned therein. The piston may be coupled to an engine crankshaft (not shown) so that reciprocating motion of the piston is translated into rotational motion of the crankshaft. The crankshaft may be coupled to at least one drive wheel 55 of a vehicle system 5 via an intermediate transmission 54. Further, a starter motor may be coupled to the crankshaft via a flywheel to enable a starting operation of the engine 10. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate banked configurations, such as V, in-line, boxed, etc. Each cylinder 14 in each of the banks 13 and 15 may be configured with a fuel injector 166. In the depicted example, fuel injector 166 is a direct in-cylinder injector. However, in other examples, fuel injector 166 can be configured as a port based fuel injector. In some examples, both port based and direct in-cylinder injectors may be coupled to the same engine cylinder.

Intake air supplied to each cylinder 14 (herein, also referred to as combustion chamber 14) via common intake passage 149 (and intake runners 161A-161C and 162A-162C) may be used for fuel combustion and products of combustion may then be exhausted from cylinder-specific exhaust runners feeding bank-specific exhaust passages. In the depicted example, a first bank 13 of cylinders of engine 10 can exhaust products of combustion via exhaust runners 17A, 17B, and 17C, feeding a common exhaust passage 17 and a second bank 15 of cylinders can exhaust products of combustion via exhaust runners 19A, 19B, and 19C, feeding a common exhaust passage 19. Exhaust gas oxygen sensors 163 and 164 may be positioned downstream of the exhaust runners 17A-C and 19A-C, respectively, in common exhaust passages 17 and 19, respectively. Exhaust passages 17 and 19 may also be referred to herein as exhaust manifolds 17 and 19. In this way, the exhaust runners 17A-C and 19A-C fluidly couple cylinders 14 in each bank (13 and 15) to the exhaust manifolds 17 and 19, respectively. Furthermore, the exhaust gas oxygen sensors 163 and 164 may be fluidly coupled to the exhaust manifolds 17 and 19. Exhaust gas oxygen sensors 163 and 164 may measure oxygen content, flow rate, and or AFR of the exhaust gas in exhaust manifolds 17 and 19. As such, the exhaust gas oxygen sensors 163 and 164 may measure aggregate (e.g., overall, combined) oxygen content, flow rate, and or AFR of the exhaust gas expelled from cylinders in the bank upstream and fluidly coupled to the common exhaust manifold 17 or 19.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Products of combustion that are exhausted by the individual cylinders of bank 13 of engine 10 via exhaust runners 17A, 17B, and 17C, and exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by the individual cylinders of bank 15 of engine 10 via exhaust runners 19A, 19B, and 19C, and exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may modulate between air pressures in intake passage 144 arranged upstream of compressor 132 and intake passage 149 arranged downstream of compressor 132 for facilitating the actuation of wastegate 138 via the actuator. In other examples, other suitable approaches other than a solenoid valve may be used for actuating wastegate 138.

Products of combustion exhausted by the cylinders via exhaust passage 17 may be directed to the atmosphere via exhaust passage 170 downstream of turbine 124, while combustion products exhausted via exhaust passage 19 may be directed to the atmosphere via exhaust passage 180 downstream of turbine 134. Exhaust passages 170 and 180 may include one or more exhaust after-treatment devices, such as a catalyst, and one or more exhaust gas sensors. For example, as shown in FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically reset by operating at least one cylinder of the engine within a particular air/fuel ratio, for example.

Engine system 100 further includes low-pressure (LP) EGR systems 106 and 108. LP EGR system 106 routes a desired portion of exhaust gas from exhaust passage 180 to intake passage 144, whereas LP EGR system 108 routes a desired portion of exhaust gas from exhaust passage 170 to intake passage 142. In the depicted embodiment, EGR is routed in an EGR passage 195 from downstream of turbine 134 to intake passage 144 at a mixing point located upstream of compressor 132. Similarly, EGR is routed in an EGR passage 197 from downstream of turbine 124 to intake passage 142 at a mixing point located upstream of compressor 122. The amount of EGR provided to intake passages 144 and 142 may be varied by the controller 12 via EGR valves 119 and 121 coupled in the LP EGR systems 106 and 108, respectively. In the example embodiment shown in FIG. 1, LP EGR system 106 includes an EGR cooler 111 positioned upstream of EGR valve 119, and LP EGR system 108 includes an EGR cooler 113 positioned upstream of EGR valve 121. EGR coolers 111 and 113 may reject heat from the recirculated exhaust gas to engine coolant, for example. It will be appreciated that in alternative embodiments, engine 10 may include one or more high pressure (HP) EGR systems as well as the LP EGR systems, to divert at least some exhaust gas from the engine exhaust passages, upstream of the turbines, to the engine intake, downstream of the compressors.

The EGR dilution percentage of the intake charge in intake passage 149 at a given time (e.g., the proportion of combusted gases to air in an intake passage of the engine) may be inferred from the output of an intake oxygen sensor 168. In the depicted embodiment, the intake oxygen sensor is positioned at a juncture of intake passages 146, 148, and 149 and upstream of air cooler 154. However, in other embodiments, sensor 168 may be arranged downstream of air cooler 154, or at another location along intake passage 149. Intake oxygen sensor 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 119, EGR valve 121, AIS throttle 115, CRV 152, CRV 155, wastegate 138, and wastegate 128 to achieve a desired EGR dilution percentage of the intake charge. The distribution of EGR gas to each of the intake runners 161A-161C and 162A-162C may be determined with a cylinder EGR distribution measurement system, as described below with reference to FIGS. 2, 3, and 8.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Low pressure AIS system 191 may include temperature sensor 187 and/or humidity sensor 188. EGR passage 195 may include temperature sensor 198. Similarly, EGR passage 197 may include temperature sensor 199. Further, while not depicted herein, each of intake passages 142 and 144 can include a mass air flow sensor. Furthermore, while not depicted herein, engine system 100 may include an engine position sensor from a Hall effect sensor sensing crankshaft position.

Turning now to FIG. 2, it illustrates a schematic for a cylinder EGR distribution measurement system 200, including a vacuum pump 210, exhaust system 270, and a controller 212. The vacuum pump 210 may include a positive displacement pump, and may be positioned externally to the engine 10. Cylinder EGR distribution measurement system 200 may be utilized for determining the distribution of EGR or EGR concentrations delivered to individual cylinders of an engine 10. Cylinder EGR distribution measurement system 200 further includes a plurality of intake sampling chambers 234, 236, 238, 254, 256, and 258, each of the separate intake sampling chambers corresponding to an individual cylinder of the engine 10, and each of the separate intake sampling chambers including a gas composition sensor coupled thereto. Cylinder EGR distribution measurement system 200 further includes a plurality of exhaust sampling chambers 252 and 232, each of the separate exhaust sampling chambers corresponding to an individual engine bank exhaust passage of the engine 10, and each of the separate exhaust sampling chambers including a gas composition sensor coupled thereto. By coupling the gas composition sensors to the cylinder EGR distribution measurement system 200 rather than the engine (e.g., at the engine intake runners and/or the engine exhaust passages), cylinder EGR distribution can be characterized without modifying an existing engine. Furthermore, the gas composition sensors can be employed and repeatedly utilized for characterizing cylinder EGR distribution of multiple engines.

Controller 212 may include a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed. Controller 212 may be configured to receive signals from each of the gas composition sensors 224, 226, 228, 254, 256, 258, 232, and 252 coupled to the intake and exhaust sampling chambers. Controller 212 may further receive signals from ambient air sensors 280 and/or 290 coupled to ambient air sampling chambers 282 and/or 292. Controller 212 may further be configured to transmit signals to actuate vacuum pump 210. Actuating vacuum pump 210 may include switching the vacuum pump ON and OFF, and regulating a speed of the vacuum pump 210.

The EGR concentrations delivered to individual cylinders of the engine 10 may be estimated based on gas compositions measured from separate intake runners 161A-161C and 162A-162C fluidly coupled to individual engine cylinders. As shown in FIG. 2, the intake runners 161A, 161B, and 161C of engine bank 15 are fluidly coupled to intake sampling chambers 234, 236, and 238, respectively. Similarly, the intake runners 162A, 162B, and 162C of engine bank 13 are fluidly coupled to intake sampling chambers 254, 256, and 258, respectively. Furthermore, each of the exhaust passages 17 and 19 from banks 13 and 15, respectively, may be fluidly coupled to exhaust sampling chambers 252 and 232, respectively. Additionally or alternatively, as further described below, exhaust gas composition sensors 221 and 241 may be positioned at the exhaust passages 19 and 17, respectively, for measuring the exhaust gas composition. In one embodiment, positioning the exhaust gas composition sensors 221 and 241 at the exhaust passages 19 and 17, respectively, may preclude including the exhaust sample chambers 232 and 252, and exhaust gas composition sensors 222 and 242. In such an embodiment, the exhaust gas composition from exhaust passages 17 and 19 may be measured directly in each of the exhaust passages by exhaust gas composition sensors 241 and 221, respectively. Positioning the intake gas composition sensors at intake sampling chambers 234, 236, 238, 254, 256, and 258 fluidly coupled to and external to the intake runners may be advantageous to positioning the intake gas composition sensors at the intake runners (161A-161C, and 162A-162C) because the intake gas composition sensors, being catalytic in nature, may extract oxygen from the intake gas, which may alter the intake air fuel ratio and engine performance. Furthermore, the engine control algorithm complexity, as related to the injection system, may be increased in order to be able to account for the oxygen uptake by the intake gas composition sensor positioned at the intake runners.

Fluidly coupling each of the intake runners 161A-161C and 162A-162C and the exhaust passages 17 and 19 to the intake and exhaust sampling chambers may include connecting tubing such as Teflon tubing therebetween. Teflon tubing may be advantageous because of its flexibility, inertness, and low coefficient of friction. Other types of inert tubing may be utilized. For example, stainless steel tubing may be used for fluidly coupling the pressure sensors (223, 225, 227, 229, 243, 245, 247, 249) to each of the sample chambers. As another example, stainless steel tubing may be used for fluidly coupling the exhaust gas composition sensors to the exhaust passages 17 and 19. Stainless steel tubing may be advantageous because of its higher temperature heat resistance, inertness, and low coefficient of friction. One of a plurality of sensors (224, 226, 228, 244, 246, 248, 222, and 242) is coupled to each of the intake and exhaust sampling chambers 234, 236, 238, 254, 256, 258, 232, and 252. The sensors (224, 226, 228, 244, 246, 248, 222, and 242) may each include a gas composition sensor for monitoring gas composition in the sample chamber and a pressure transducer for monitoring fluid pressure in the sample chamber.

Furthermore, each of the intake and exhaust sampling chambers is fluidly coupled to vacuum pump 210. Thus, each of the intake runners and exhaust passages are fluidly coupled to a separate sampling chamber equipped with a gas composition sensor and each separate intake and exhaust sampling chambers is fluidly coupled to the vacuum pump 210. As such, when the vacuum pump 210 is switched ON, a portion of intake charge gas may be simultaneously drawn and diverted from each of the intake runners to the corresponding intake sampling chamber. Furthermore, when the vacuum pump 210 is switched ON, a portion of exhaust gas may be simultaneously drawn and diverted from each of the exhaust passages 17 and 19 to the corresponding exhaust sampling chambers 252 and 232, respectively. Alternately, for the case where exhaust gas composition sensors 221 and 241 are positioned in the exhaust passages 17 and 19, exhaust gas may not be drawn and diverted to the vacuum pump 210 by way of exhaust gas sample chambers 232 and 252. Rather, the exhaust gas composition at the exhaust passages 17 and 19 may be measured by exhaust gas composition sensors 241 and 221, respectively. In other words during a condition when a portion of intake charge gas is drawn and diverted by the vacuum pump from intake runner 161A to intake sampling chamber 234, a portion of intake charge gas may be drawn and diverted by the vacuum pump from intake runner 161B to intake sampling chamber 236, a portion of intake charge gas may be drawn and diverted by the vacuum pump from intake runner 161C to intake sampling chamber 238, a portion of intake charge gas may be drawn and diverted by the vacuum pump from intake runner 162A to intake sampling chamber 254, a portion of intake charge gas may be drawn and diverted by the vacuum pump from intake runner 162B to intake sampling chamber 256, a portion of intake charge gas may be drawn and diverted by the vacuum pump from intake runner 162C to intake sampling chamber 258, a portion of exhaust gas may be drawn and diverted by the vacuum pump from exhaust passage 17 to exhaust sampling chamber 252, and a portion of exhaust gas may be drawn and diverted by the vacuum pump from exhaust passage 19 to exhaust sampling chamber 232. Because the vacuum pump 210 is positioned externally to the engine 10, intake and/or exhaust gas from the intake runners and/or exhaust passages by the vacuum pump 210 bypasses the engine 10 as it flows towards the vacuum pump 210.

When the vacuum pump 210 is switched ON, a flow rate of intake gas from intake runners 161A-161C and 162A-162C, and in some embodiments a flow rate of exhaust gas from exhaust passages 17 and 19, to their corresponding gas sample chambers (234, 236, 238 and 254, 256, 258 and/or 232 and 252, respectively) may be commensurate with a pressure drop between the intake runners and/or exhaust passages and the corresponding gas sample chambers. Since the vacuum pump 210 reduces a pressure at each of the intake and exhaust gas sample chambers below an intake pressure, a flow rate of sampled gas diverted and drawn from the intake runners and/or exhaust passages may be higher as compared to when the vacuum pump 210 is OFF. For example, when the vacuum pump 210 is OFF, flow of intake gas from the intake runners to the intake sample chambers and flow of exhaust gas from the exhaust passages to the exhaust sample chambers may substantially cease since the pressures in the intake and exhaust sample chambers are not substantially less than the pressures in the intake runners and exhaust passages. In another example, when the vacuum pump is switched from ON to OFF, the flow rate of intake gas from the intake runners to the intake sample chambers and the flow rate of exhaust gas from the exhaust passages to the exhaust sample chambers may decrease to zero (no flow) as the pressure in the intake and exhaust sample chambers equilibrates (e.g., rises) to the pressure in the intake runners and the exhaust passages, respectively. In some examples, the engine intake pressure may be below an atmospheric pressure, such as during induction of intake gas by the engine cylinders while intake air is restricted by the throttle or otherwise. For the case when the engine 10 includes a boosted and/or supercharged engine, the intake pressure may be greater than atmospheric pressure; in this case, when the vacuum pump 210 is switched from ON to OFF, the flow rate of intake gas from the intake runners to the intake sample chambers and the flow rate of exhaust gas from the exhaust passages to the exhaust sample chambers may decrease to zero (no flow) as the pressure in the intake and exhaust sample chambers equilibrates (e.g., rises) to the (boosted and/or turbocharged) pressure in the intake runners and the exhaust passages, respectively.

In one embodiment, although not depicted in FIG. 2, flow control valves may be optionally installed between each intake runner and its corresponding intake sample chamber, and/or between each exhaust passage and its corresponding exhaust sample chamber to aid in regulating flow of intake and exhaust gases from the engine to the cylinder EGR distribution measurement system sample chambers. Each of the flow control valves may be equivalent so that the pressure drops across each intake runner—intake sample chamber pair are maintained equivalent and so that the pressure drops across each exhaust passage—exhaust sample chamber are maintained equivalent. The addition of these flow control valves may aid in timing the starting and stopping of gas flow from the engine to the cylinder EGR distribution measurement system when the vacuum pump is switched ON and OFF, however their installation may add additional costs and operational complexity.

Furthermore, when a vacuum pump speed is increased, a flow rate of sampled gas diverted and drawn from the intake runners and/or exhaust passages may be higher as compared to when the speed of the vacuum pump 210 is lower. Furthermore, when a vacuum pump speed is increased, a pressure drop from the intake runners and/or exhaust passages to the vacuum pump may be larger as compared to when the speed of the vacuum pump 210 is lower. Thus, switching the vacuum pump ON actively draws sample gas from the intake runners and/or exhaust passages to the intake and exhaust sample chambers and the vacuum pump. As such, the time delay for transporting gas from the intake runners and/or exhaust passage to the sample chambers is reduced. Furthermore, the duration for transporting gas from the intake runners and/or exhaust passage to the sample chambers may be reduced relative to conventional EGR distribution measurement systems which passively draw sample gas from one intake runner because the intake and exhaust gas composition sensors may be fluidly coupled more closely to the intake runners and exhaust passages, which enables faster measurement response times with higher measurement sensitivities.

When the vacuum pump 210 is switched ON by the controller 212, and when a portion of intake charge and exhaust gas is drawn into the intake and exhaust sampling chambers, the controller 212 may receive signals from one or more gas composition sensors 224, 226, 228, 244, 246, 248, 222, and 242 coupled to intake and exhaust sampling chambers 234, 236, 238, 254, 256, 258, 232, and 252, respectively, indicating the gas composition measured in the respective sampling chambers. Furthermore, when the vacuum pump 210 is switched ON, ambient air may be drawn into ambient air sampling chamber 282 fluidly coupled thereto and controller 212 may receive a signal from ambient air gas composition sensor 280 indicating the gas composition of the ambient air. Alternatively, cylinder EGR distribution measurement system 200 may include an ambient air sampling chamber 292 (fluidly decoupled from vacuum pump 210) with an ambient air gas composition sensor 290 coupled thereto that measures the ambient air gas composition of ambient air; in this case, the controller 212 may receive a signal from ambient air gas composition sensor 290 indicating the ambient air gas composition. As such, the controller 212 may simultaneously measure the gas composition in each of the intake and exhaust sampling chambers, as well as the ambient air gas composition.

Each of the sampling chambers 234, 236, 238, 254, 256, 258, 232, and 252 may include a rigid sample block for mounting and fixing positions and orientations of sample inlet and outlet lines (e.g., tubing), the gas composition sensor, and a pressure sensor. In this way the rigid sample block may include four orifices corresponding to the sample inlet and outlet lines, the gas composition sensor, and the pressure sensor, respectively. The pressure sensors 223, 225, 227, 229, 243, 245, 247, and 249 may aid in monitoring a pressure in each of the intake and exhaust sample chambers, and can aid in maintaining accuracy of the gas composition measurements since the gas composition (e.g., $O_2$ composition, $CO_2$ composition, and the like) measurement may drift significantly when a pressure change greater than a threshold pressure change occurs. Furthermore, the drift in gas composition measurement with pressure may be a function of the gas composition. For example, at gas compositions near $\lambda=1$ (stoichiometric air-to-fuel ratio), the drift in gas composition with changing pressure may be smaller as compared to the drift in gas composition with changing pressure at gas compositions where 1 is farther from 1 (stoichiometric air-to-fuel ratio). In one example, the threshold pressure change may include approximately 30 kPa. In another example, the threshold pressure change may be a function of gas composition, where the threshold pressure change is higher when $\lambda=1$ (or when $\lambda$ is closer to the stoichiometric air-to-fuel ratio), and where the threshold pressure change is lower when $\lambda$ is farther from the stoichiometric air-to-fuel ratio). In this way, the magnitude of the threshold pressure change may be reflective of the sensitivities of the gas composition sensor measurement to pressure changes.

Although not shown in FIG. 2, pressure sensors may further be positioned at each exhaust passage 17 and 19 to monitor the pressures thereat. Each of the sample chamber and exhaust passage pressure sensors may be in electronic communication with the controller 212 such that in response to a pressure change greater than the threshold pressure change, the controller 212 may take action such as displaying a message to the operator that the pressure has drifted beyond the threshold pressure change. Additionally, responsive to a pressure change greater than the threshold pressure change, the controller 212 may wait for a threshold equilibration duration to allow the engine operating conditions to equilibrate and for the pressure to return to its original level prior to the pressure drift, before taking further gas composition measurements. In one example, the sample block can include an aluminum block positioned adjacent to the engine.

As shown schematically in FIG. 2, each intake sample chamber may be mounted at a surface of the sample block such that each intake sample chamber is positioned equidistant to its corresponding engine cylinder intake runner. Similarly, each exhaust sample chamber may be mounted at a surface of the sample block such that each exhaust sample chamber is positioned equidistant to its corresponding engine exhaust passage. Furthermore, the line length fluidly coupling each of the intake sample chambers and their corresponding intake runners may be equivalent to the line lengths fluidly coupling each of the exhaust sample chambers and their corresponding exhaust passage. In this way, the tubing lengths for the sampling lines fluidly coupling each intake sample chamber to its corresponding intake runner and each exhaust sample chamber to its corresponding exhaust passage may be equal in length. As such, a pressure drop and a flow rate of intake gas from each intake runner to its corresponding intake sample chamber may be maintained equivalent, or approximately or nearly equivalent, and a pressure drop and a flow rate of exhaust gas from each exhaust passage to its corresponding exhaust sample chamber may be maintained equivalent, or approximately or nearly equivalent. In one example, maintaining approximately or nearly equivalent pressure drops across each intake runner-intake sample chamber pair (or across each exhaust passage-exhaust sample chamber pair) may include maintaining pressure drops across each intake runner-intake sample chamber pair within a threshold pressure range, for example within 0.1 psi. In embodiments where the exhaust gas composition sensors are positioned within the exhaust passages, the controller 212 may coordinate the timing so that the exhaust gas composition measurements are obtained simultaneously with the intake gas composition measurements.

The surfaces of the sample chambers that contact the sample gas (e.g., intake gas, exhaust gas) may include stainless steel with four openings for mounting a gas composition sensor, for the inlet line from the intake runner or exhaust passage, for the outlet to the vacuum pump, and for pressure compensation. In one example, the gas composition sensors may include ceramic gas composition sensors, including ceramic sensors capable of measuring $O_2$ and/or $CO_2$ composition. Utilization of ceramic gas composition sensors is advantageous because they can tolerate higher temperatures, have faster response and measurement times, and are equally or more sensitive as compared to non-ceramic sensors. Furthermore, ceramic sensors exhibit higher durability while being more inexpensive as compared to non-ceramic sensors and can be hot-swappable; in other words, when a ceramic sensor is damaged, they can be replaced in-line easily, thereby reducing system downtime. Because ceramic sensors are self-heating, they are self-cleaning and can be easily calibrated by exposing them to ambient air for several minutes to readjust them to ambient gas concentrations on a weekly basis. In contrast, conventional gas analyzers may be calibrated daily or even hourly to maintain reliability and accuracy of gas composition measurements, depending on the application. Further still, ceramic sensors are solid state sensors with no moving parts, and thereby exhibit higher reliability as compared to non-ceramic sensors. Similarly, utilization of ceramic gas composition sensors increases a reliability of the overall EGR distribution measurement system 200 by reducing the number of mechanically moving parts when the system is in operation.

The ceramic gas composition sensors may be threaded into the sample block to reliably position and contact the sensor's active measurement surface with the gas fluid flowing through the sample chamber. In this way the positioning of the ceramic gas composition sensors relative to the flow of the intake and/or exhaust gas inside the sample chamber can be more consistent and uniform across each intake and exhaust gas sample chamber. Furthermore, the time for intake gas and exhaust gas to flow from the intake runners and the exhaust passage to the intake and exhaust sample chamber gas composition sensors can be reduced relative to conventional EGR measurement systems.

The sample inlet lines fluidly coupling each of the intake runners and exhaust passages to one of the intake and exhaust sample chambers may be configured to be of similar length and diameter so that a path taken by the gas from an intake runner to an intake sample chamber, or an exhaust passage to the exhaust sample chamber may be similar in length. Furthermore, a pressure drop from the intake runner or exhaust passage to the intake sample chamber or exhaust sample chamber may be similar. As such, any transport delay for gas samples from the engine to the sample chambers can be uniformly reduced for all gas sample measurements. To this end, positioning of sample chambers relative to the intake runners and positioning of the vacuum pump 210 relative to each of the sample chambers may be selected so as to maintain sampling distances (and sampling times) that are uniform across each intake runner and exhaust passage. In other words a duration for intake gas to flow from each intake runner to its corresponding sample chamber and intake gas composition sensor may be closely aligned. Furthermore, the controller 212 may wait to measure the intake, exhaust, and/or ambient gas compositions until after a threshold duration following switching ON the vacuum pump 210, which may allow for gas flow in each of the intake, exhaust, and/or ambient gas sample chambers to equilibrate. By allowing the gas flow in each of the intake, exhaust, and/or ambient gas sample chambers to equilibrate, a reliability and accuracy of the gas flow measurement may be increased. Because the sampled gas flow rates to each of the sample chambers is low, the equilibration time may be reduced relative to conventional EGR measurement systems. In one example the threshold duration may be approximately 30 seconds. In another example, the threshold duration may be less than 10 minutes. Furthermore, the threshold duration may depend on EGR functionality for a specific engine type.

The gas composition sensors may measure a gas composition of the gas within the intake, exhaust or ambient gas sample chambers. Measuring the gas composition may include one or more of measuring the $CO_2$, CO, ppm $NO_x$, and/or oxygen content (% $O_2$) of the gas within the corresponding sample chamber. The cylinder EGR distribution measurement system estimates EGR dilution rates based on the measured gas composition in the intake runner(s), exhaust passage(s), and ambient air. In this way, the cylinder EGR distribution measurement system 200 may estimate the instantaneous EGR distribution delivered to the individual cylinders. As an example, the controller 212 may calculate an estimated EGR concentration based on equation (1).

$$\% \ EGR = \frac{CO_{2,ambient} - CO_{2,intake \ n \ sample}}{CO_{2,ambient} - CO_{2,exhaust \ N \ sample}} * 100 \%, \quad \text{Equation 1}$$

where % EGR is the percent EGR content in the intake gas delivered to cylinder n, $CO_{2,ambient}$ is the measured % $CO_2$ content in the ambient air, $CO_{2,intake \ n \ sample}$ is the % $CO_2$ measured in the intake gas delivered to cylinder n, $CO_{2,exhaust \ N \ sample}$ is the measured % $CO_2$ in the exhaust passage of bank N corresponding to the cylinder n. The % $CO_2$ measurements may be may be made on a molar basis, with the corresponding % EGR being calculated on a % mole basis. Calculation of the % EGR may be performed by way of executable instructions stored in memory on board the controller 212.

In another example, the controller 212 may calculate the estimated EGR concentration on an oxygen gas composition basis according to equation (2);

$$\% \ EGR = \frac{O_{2,ambient} - O_{2,intake \ n \ sample}}{O_{2,ambient} - O_{2,exhaust \ N \ sample}} * 100 \%, \quad \text{Equation 2}$$

where % EGR is the percent EGR content in the intake gas delivered to cylinder n, $O_{2,ambient}$ is the measured % $O_2$ content in the ambient air, $O_{2,intake \ n \ sample}$ is the % $O_2$ measured in the intake gas delivered to cylinder n, $O_{2,exhaust \ N \ sample}$ is the measured % $O_2$ in the exhaust passage of bank N corresponding to the cylinder n. The % $O_2$ measurements may be may be made on a molar basis, with the corresponding % EGR being calculated on a % mole basis. As described above with reference to equation (1), calculation of the % EGR may be performed by way of executable instructions stored in memory on board the controller 212.

After passing through the gas sample chambers, the intake and exhaust gas diverted from the intake runners and exhaust passages is drawn to the vacuum pump and exhausted via an exhaust system 270. Exhaust system 270 may include an air exhaust system, including one or more emissions control devices such as particulate filters, molecular sieves, and the like for reducing emissions from the system. In one embodiment, the exhaust system 270 may comprise steel pipes fitted with mounting joints for coupling emissions control devices and/or sensors such as pressure sensors thereto. The exhaust system 270 may include a plurality of steel pipes each corresponding to exhaust gas flow from the intake sample chambers, and each of the exhaust passages. Furthermore, the outlet of the exhaust system 270 may be coupled to an open air exchanger or a building exhaust system since the volume of gas sampled by the cylinder EGR distribution system is small and has minimal impact on engine performance. In other examples, as described below with reference to box 272 of FIG. 2, the outlet of the exhaust system 270 may be returned to the engine intake. Returning the gas to the engine intake as shown by box 272 may aid in reducing emissions and in maintaining steady-state engine operation.

Additionally, the controller 212 may receive signals from other sensors (as indicated by dashed line 216), including engine sensors such as one or more of the intake oxygen sensor 168, HP AIS pressure sensor 169, LP AIS pressure sensor 186, manifold pressure sensor 182, manifold temperature sensor 183, TIP sensor 172, throttle inlet temperature sensor 173, temperature sensor 187, humidity sensor 188, and the like for coordinating timing of the cylinder EGR distribution measurement system 200 with the engine operation. For example, in response to receiving signals from engine sensors indicating the engine is operating at steady-state at the selected or set operating conditions the controller 212 may switch ON the vacuum pump 210 to divert and draw intake and exhaust gases from the intake runners and the exhaust passages to the intake and exhaust sample chambers of the cylinder EGR distribution measurement system 300. Furthermore, the controller 212 may send signals to one or more other actuators (indicated by dashed arrow 214) of the engine such as the HP throttle actuator 157, LP throttle actuator 117 fuel injectors 166, valve cam actuation system 25, EGR valves 119 and 121, and the like. In one example, controller 212 may send signals to one or more engine actuators to set engine operation at a selected operating condition for EGR distribution testing.

As another example, after passing through the gas sample chambers, the intake and exhaust gas diverted from the intake runners and exhaust passages is drawn to and exhausted from the vacuum pump, and then returned to the engine intake, as indicated by box 272 of FIG. 2. Returning the measured intake and exhaust sample gas to the engine intake may aid in reducing emissions from the cylinder EGR distribution measurement system 200. Furthermore, returning the measured intake and exhaust sample gas to the engine intake may include returning the measured intake and exhaust sample gas to a position fluidly coupled upstream from the intake manifold 160, including the intake passage 149, intake air passages 146 and/or 148, and/or intake passages 140 and/or 142, and/or 144. In other examples, a portion of the measured intake and exhaust sample gas may be expelled to exhaust 270 and the remaining portion of the measured intake and exhaust sample gas may be returned to the engine intake (as indicated at 272). Returning at least a portion of the measured intake and exhaust sample gas to the engine intake may aid in maintaining steady-state engine operating conditions. Furthermore, during conditions when a portion of the measured intake and exhaust sample gas are returned to the engine intake, the ambient air sample chamber and ambient air sensor may be fluidly decoupled from the vacuum pump.

Turning now to FIG. 3, it illustrates an example embodiment of the cylinder EGR distribution measurement system 200 of FIG. 2. Specifically, the portable (e.g., mobile) cylinder EGR distribution measurement system 300 is configured to be portable and/or mobile such that the system can be easily moved or transported by an individual person to measure and test different engine apparatus, including engines located in multiple laboratories, rooms, locations, and the like. Furthermore, the portable cylinder EGR distribution measurement system 300 may be configured to be removably electrically coupled for controller area network (CAN) communications including ATI, INCA, ADACS, PUMA, and the like. The portability and/or mobility of the cylinder EGR distribution measurement system 300 may be conferred at least partially by positioning the vacuum pump 210, controller 212, and intake and exhaust sample chambers on a mobile and/or portable base. One embodiment of a mobile and/or portable base is a wheeled cart 310. Another embodiment of a portable base may be a system that can be inserted into a mounting slot of a wall-mounted system. In one example, an operator 302 may reposition the cylinder EGR distribution measurement system 300 by pushing the handle 314 of wheeled cart 310. In this way, the portable cylinder EGR distribution measurement system 300 may be easily relocated and coupled to measure EGR distribution of an engine. The portability/mobility of the cylinder EGR distribution measurement system 300 reduces the amount of repositioning of engines to accommodate cylinder EGR distribution measurement and testing. Because engines are bulky and can weigh several hundred pounds reducing an amount of repositioning of an engine during testing and development can aid in reducing costs and labor associated with engine technology development. For example, the cylinder EGR distribution measurement system 300 may be fluidly coupled to a first engine for characterizing the cylinder EGR distribution for the first engine; once completed, the cylinder EGR distribution measurement system 300 may be fluidly decoupled from the first engine and may be fluidly coupled to a second engine for characterizing the cylinder EGR distribution for the second engine, without transporting or changing a position of the first engine and the second engine. Furthermore, several components of the portable EGR distribution measurement system 300 can be replaced and/or interchanged with compatible components, without having the disconnect the portable EGR distribution measurement system 300 as a whole.

In the example of FIG. 3, the portability/mobility of cylinder EGR distribution measurement system 300 is enabled by positioning each component of cylinder EGR distribution measurement system 300 on a wheeled cart 310. The wheeled cart includes wheels 316 and may include a plurality of shelves or levels 318 to accommodate vertical positioning of the vacuum pump 210, a computer controller (e.g., corresponding to controller 212), exhaust 270, and the plurality of sample chambers (234, 236, 238, 254, 256, 258, 232, 252, and 282 (or 292)) with gas composition and pressure sensors, and sample inlets/outlets associated therewith. Although not shown in FIG. 3, the sample chambers (234, 236, 238, 254, 256, 258, 232, 252, and 282 (or 292)) include the gas composition sensors and pressure sensors mounted therein, as depicted in FIG. 2. The computer controller 212 may include a user interface 313 including various input/output devices for receiving user input (e.g., keyboard, mouse, touchpad, touchscreen, and the like), and for displaying output to the operator 302. For example, the operator 302 may input engine operating conditions to the computer controller 212 for testing the cylinder EGR distribution, and the computer controller 212 may display current and trending engine operating conditions and current cylinder EGR distribution measurement system 300 conditions to the operator. Thus, the operator 302 may control one or both of the engine operation and the operation of the cylinder EGR distribution measurement system 300 via the user interface 313.

In one example, positioning the vacuum pump below the sample chambers can aid in drawing sample gases from the intake runners and exhaust passages to the intake and exhaust sample chambers. Furthermore, positioning heavier components such as the vacuum pump 210 below the sample chambers may aid in improving stability of the system as well as aid in ergonomics. Further still, having the top level 318 relative clear of equipment may allow for it to function as an operator work surface or tabletop. As another example, positioning the computer controller 212 above the sample chambers may allow easier and more ergonomic access to the computer controller input/output interface 313, while reducing contamination of the computer controller 313 from contact with engine exhaust, combustion gases, and particulate. Furthermore, vertical positioning of the components of cylinder EGR distribution measurement system 300 on wheeled cart 310 may reduce a length of sample lines for fluidly coupling the intake and exhaust gas sample chambers to the vacuum pump and to their respective intake runner and exhaust passages of the engine. Reducing a length of the sampling lines may aid in reducing transport times for sample gas to reach the sample chambers from the intake runners and/or exhaust passage, which can increase performance and precision of the cylinder EGR distribution measurement system 300. Furthermore, vertically positioning the components of the cylinder EGR distribution measurement system 300 may aid in maintaining a consistent sample line length across all intake runner/intake sample chamber and exhaust passage/exhaust sample chamber pairs, thereby helping to maintain consistency and uniformity in gas transport times and measurement times for each gas sample.

Figure 6:
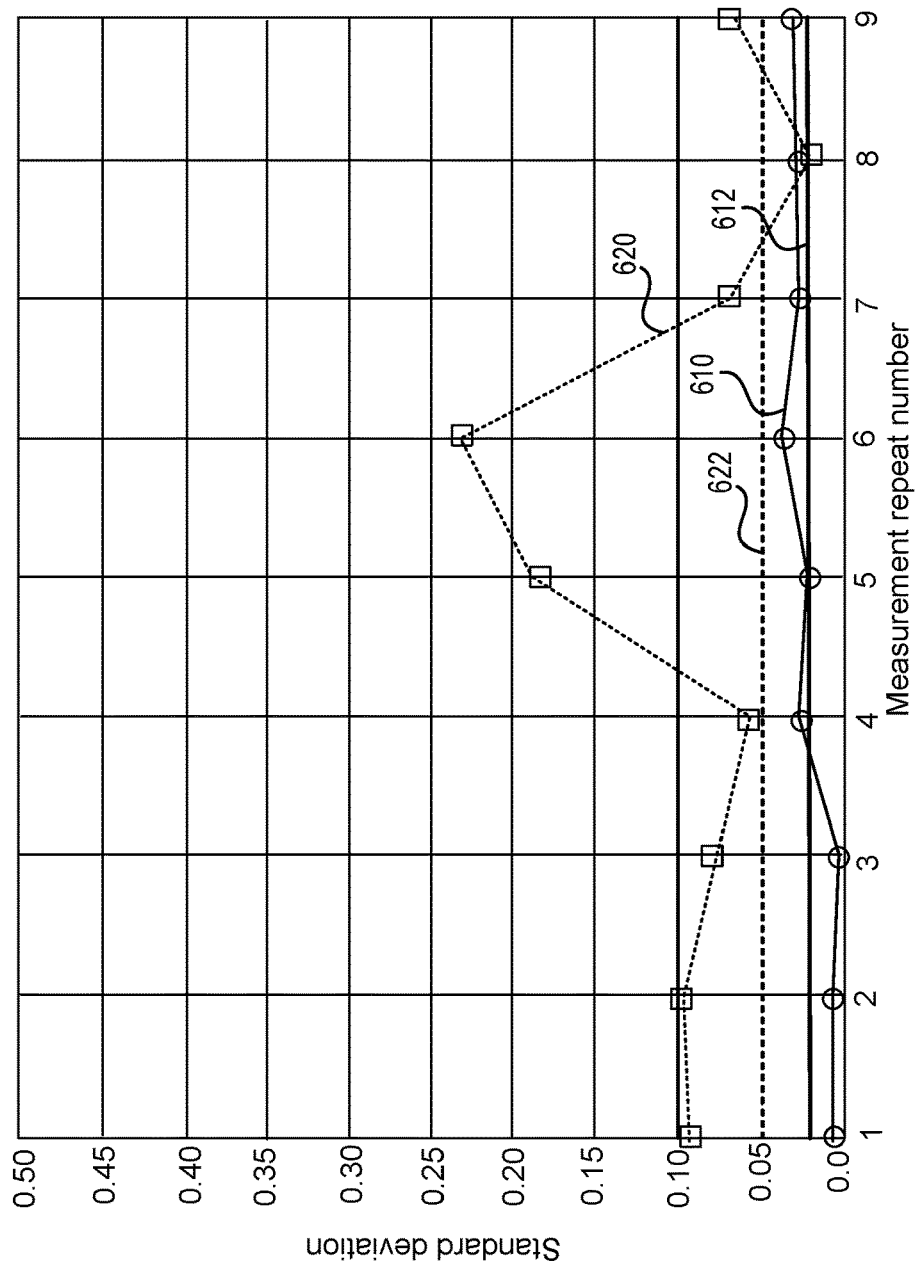

Turning now to FIGS. 4-7, it shows data plots comparing performance from a portable cylinder EGR distribution measurement system 300 and a conventional bench (non-portable, non-mobile) system that measures one cylinder intake runner gas sample at a time. Data plot 400 illustrates EGR measurements that were collected and compared from both systems over a range of % EGRs from <5% to >20%. Linear regression analysis showed that the average error between the two systems was about 0.25%. Thus, the portable cylinder EGR distribution measurement system 300 increased measurement speed, while maintaining measurement accuracy and reliability. Data plot 500 illustrates that the response time 510 of the portable cylinder EGR distribution measurement system 300 for measuring the gas composition is much faster as compared to the conventional bench system 520. Furthermore, because the portable cylinder EGR distribution measurement system 300 can simultaneously measure gas samples from each intake runner and exhaust passage simultaneously, measurement speed and efficiency of the portable cylinder EGR distribution measurement system 300 relative to conventional bench systems is significantly increased. In some examples, ceramic gas composition sensors may facilitate near real-time gas composition measurements, which can reduce cylinder EGR distribution characterization times drastically as compared to conventional systems. FIG. 6 shows a data plot 600 comparing the repeatability (standard deviation) of gas composition measurements for the portable cylinder EGR distribution measurement system 300 and a conventional bench system. The dotted lines 620 and 622 indicate the repeatability (standard deviation) and mean repeatability (standard deviation), respectively, of the bench system, while the solid lines 610 and 612 indicate the repeatability and mean repeatability, respectively, of the portable cylinder EGR distribution measurement system 300. Data plot 600 illustrates that the portable cylinder EGR distribution measurement system 300 also reduces standard deviation (increase in measurement repeatability) in addition to increasing measurement speed.

Figure 7:
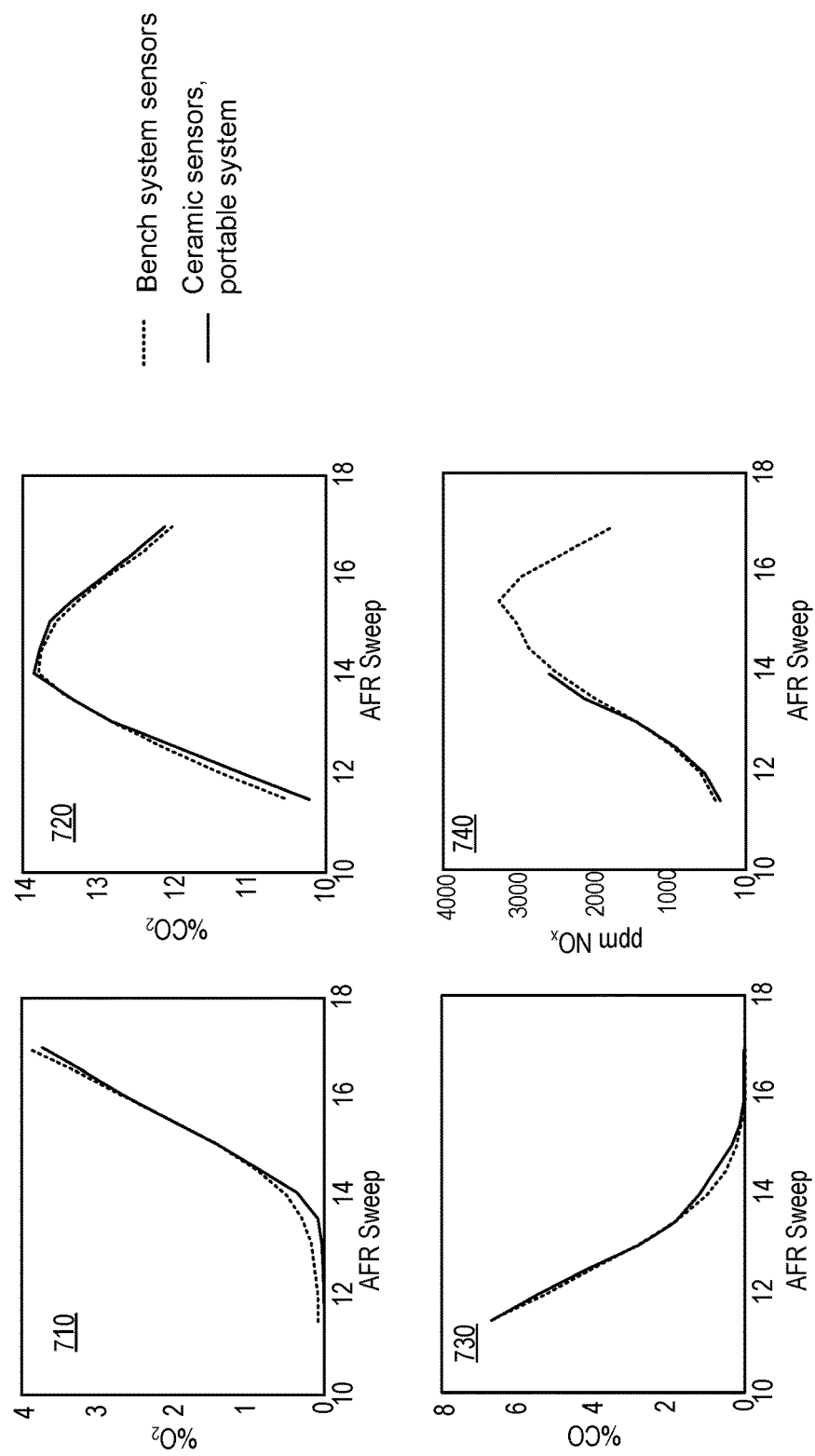
Figure 8:
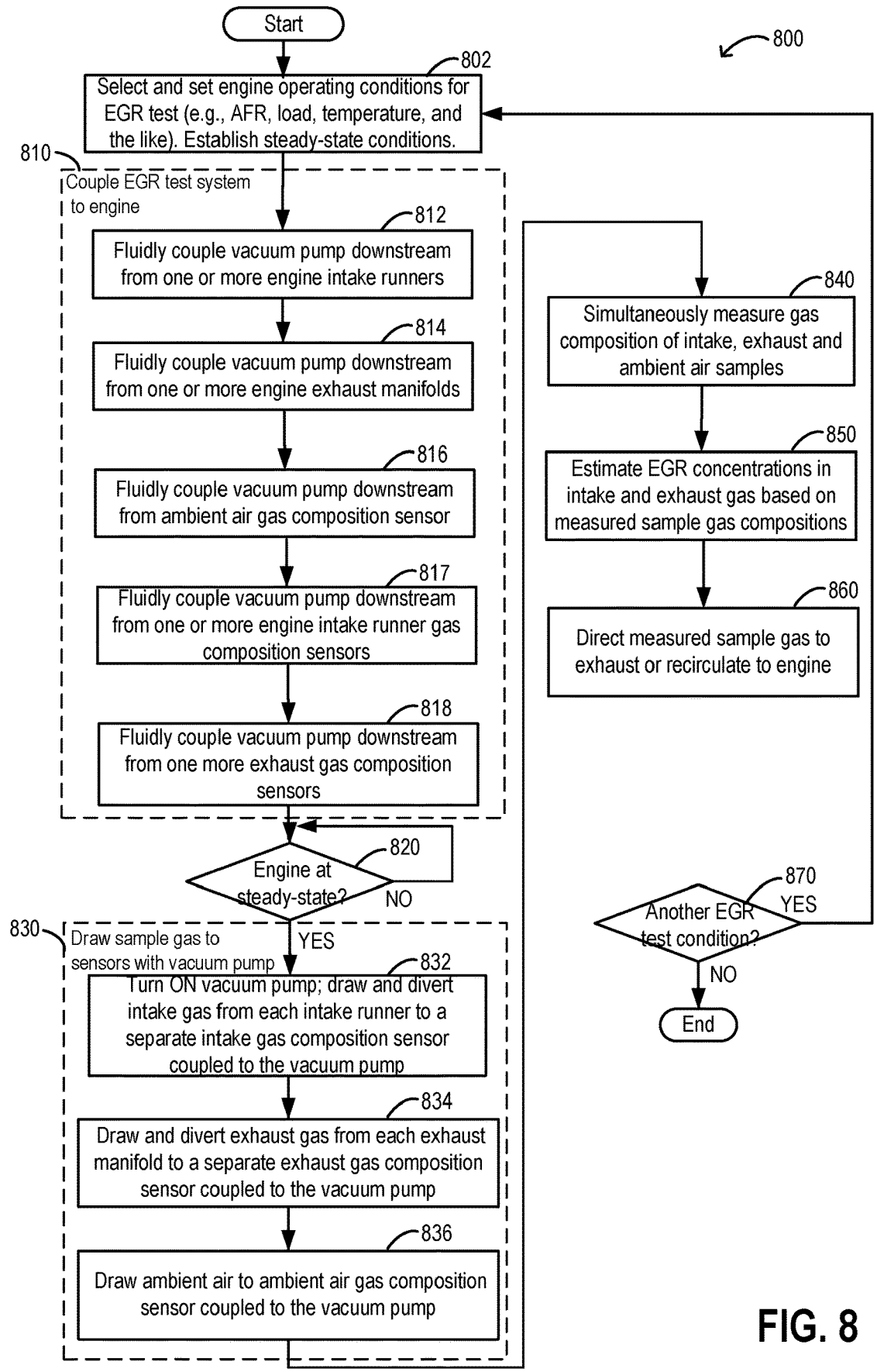
FIG. 8 shows a high-level flow chart for a method of measuring cylinder EGR distribution utilizing the cylinder EGR distribution measurement systems of FIGS. 3 and 4.

Turning now to FIG. 7, it illustrates reliability in gas composition measurements of ceramic sensors that may be utilized by the portable cylinder EGR distribution measurement system 300 as compared to conventional gas composition sensors utilized in the bench system. The data plots compare measurements for gas species % $O_2$ (710), % $CO_2$ (720), % CO (730), and ppm $NO_x$ (740) for the ceramic sensors of the portable cylinder EGR distribution measurement system 300 and the bench system sensors. As shown, the deviation in the gas composition measurements is minor for each gas species across a broad range of air fuel ratios (AFR) and gas species compositions.

Turning now to FIG. 8, it illustrates a flow chart for a method 800 of measuring cylinder EGR distribution for an engine. Method 800 may be performed as executable instructions residing in non-transitory memory on board a controller, such as controller 212 of the cylinder EGR distribution measurement system 200 or 300. Method 800 begins at 802 by selecting and setting engine operating conditions for the cylinder EGR distribution measurement test. In one example, engine operating conditions may be selected by an operator by way of a user interface 313. The engine operating conditions may include air fuel ratio, engine load, engine temperature, EGR valve % opening, and the like. In some embodiments, the controller 212 may send signals to engine actuators (as indicated by 214 and 350) such as the HP throttle actuator 157, LP throttle actuator 117 fuel injectors 166, valve cam actuation system 25, EGR valves 119 and 121, and the like for setting engine operation at a selected operating condition. Communication between the controller 212 and sensors and actuators of the engine and the cylinder EGR distribution measurement system may be transmitted with communication lines. In one example, the communication lines may include controller area network (CAN) lines. CAN lines may be advantageous in that they facilitate high bandwidth and signal transmission speeds, while maintaining software flexibility and compatibility.

Next, method 800 continues at 810 (including steps 812 through 818) where the cylinder EGR distribution measurement system (e.g., EGR test system) is coupled to the engine. At 812, coupling the EGR test system to the engine may include fluidly coupling the vacuum pump downstream from one or more of the engine intake runners. By fluidly coupling the vacuum pump downstream from one or more of the engine intake runners, intake gas may be sampled and measured from one or more of the engine intake gas runners to determine EGR distribution to those one or more corresponding cylinders. At 814, coupling the EGR test system to the engine may include fluidly coupling the vacuum pump downstream from one or more of the engine exhaust manifolds (e.g. exhaust passages). By fluidly coupling the vacuum pump downstream from one or more of the engine exhaust manifolds (e.g. exhaust passages), exhaust gas from the one or more of the exhaust passage may be sampled and can aid in estimating and/or calculating EGR concentrations distributed to the engine cylinder intake runners.

At 816 through 818, coupling the EGR test system to the engine may include one or more of fluidly coupling the vacuum pump downstream from an ambient air gas composition sensor, fluidly coupling the vacuum pump downstream from one or more engine intake runner gas composition sensors, and fluidly coupling the vacuum pump downstream from one or more exhaust gas composition sensors. Fluidly coupling the vacuum pump downstream from an ambient air gas composition sensor, one or more engine intake runner gas composition sensors, and/or one or more exhaust gas composition sensors, allows for the cylinder EGR distribution measurement system to simultaneously measure one or more of the ambient gas composition, one or more of the engine intake runner gas compositions, and one or more of the exhaust passage gas compositions. In other words during a condition when one or more of the intake runner gas composition is measured, one or more of the ambient gas composition and one or more of the exhaust passage gas compositions may be measured. In other words, the cylinder EGR distribution system 200 facilitates multiple-cylinder sampling at once as compared to conventional systems which sample one single cylinder at a time. As such, a duration for characterizing of the cylinder EGR distribution may be reduced. As described above with reference to FIG. 2, in one embodiment, the ambient air gas composition sensor (e.g., ambient air gas composition sensor 290) may not be fluidly coupled to the vacuum pump 210.

Furthermore, fluidly coupling the vacuum pump downstream from one or more engine intake runners at 812 and fluidly couple vacuum pump downstream from one or more engine intake runner gas composition sensors at 817 may include positioning each of the engine intake gas composition sensors downstream from its corresponding engine intake runner and upstream from the vacuum pump. Further still, a path length traveled by sampled intake gas from each of the engine intake runners to its corresponding engine intake gas composition sensor may be approximately the same, and a path length traveled from each of the engine intake gas composition sensors to the vacuum pump 210 may be approximately the same so that transport delays between each of the intake runners and its corresponding intake gas composition sensor to the vacuum pump are approximately the same. In other words a tubing length coupling each of the intake runners to its corresponding intake gas composition sensor may be approximately the same and the tubing length coupling each of the intake gas composition sensors to the vacuum pump may be approximately the same.

Similarly, fluidly couple the vacuum pump 210 downstream from one or more engine exhaust passages at 814 and fluidly couple vacuum pump downstream from one more exhaust gas composition sensors at 818 may include positioning each of the engine exhaust gas composition sensors downstream from its corresponding engine exhaust passage and upstream from the vacuum pump. Further still, a path length traveled by sampled exhaust gas from each of the engine exhaust passages to its corresponding engine exhaust gas composition sensor may be approximately the same, and a path length traveled from each of the engine exhaust gas composition sensors to the vacuum pump 210 may be approximately the same so that transport delays between each of the exhaust passages and its corresponding exhaust gas composition sensor to the vacuum pump are approximately the same. In other words a tubing length coupling each of the exhaust passages to its corresponding exhaust gas composition sensor may be approximately the same and the tubing length coupling each of the exhaust gas composition sensors to the vacuum pump may be approximately the same.

Next, method 800 continues at 820 where the controller 212 may determine if the engine is operating at steady-state conditions. As described above with reference to FIGS. 2-3, the controller 212 may receive signals from other sensors including engine sensors such as one or more of the intake oxygen sensor 168, HP AIS pressure sensor 169, LP AIS pressure sensor 186, manifold pressure sensor 182, manifold temperature sensor 183, TIP sensor 172, throttle inlet temperature sensor 173, temperature sensor 187, humidity sensor 188, and the like for determining if the engine is operating at steady-state conditions and for coordinating timing of the cylinder EGR distribution measurement system 200 with the engine operation. Steady-state engine operating conditions may be indicated by one or more engine operating parameters not deviating beyond a threshold deviation before a threshold duration has elapsed. In one example, steady-state operating conditions may be indicated when engine temperature, power, torque, speed, and analytics have reached equilibrium, or do not deviate beyond their threshold deviations after the threshold duration has elapsed. For the case where engine has not maintained steady-state operation, method 800 re-executes 820. In one example, a threshold duration may include one minute.

In response to determining steady-state operation of the engine, method 800 continues at 830 (including steps 832 through 836) where sample gas is drawn from the engine into the cylinder EGR distribution measurement system with the vacuum pump. At 832, the controller 212 switches ON the vacuum pump and a portion of the intake gas from each intake runner is diverted and drawn to the corresponding intake gas sample chamber with an intake gas composition sensor coupled thereto. Each of the intake gas composition sensors and the corresponding intake gas sample chamber coupled thereto is fluidly coupled downstream from one of the intake runners and upstream from the vacuum pump. During a first condition when the vacuum pump is ON and a portion of the intake gas is drawn and diverted from one or more of the intake runners to the intake gas composition sensor downstream towards the vacuum pump, a portion of the exhaust gas from each of the exhaust passages may be diverted and drawn to a corresponding exhaust gas sample chamber with an exhaust gas composition sensor fluidly coupled thereto. Each of the exhaust gas composition sensors and the corresponding exhaust gas sample chamber coupled thereto is fluidly coupled downstream from one of the exhaust passages and upstream from the vacuum pump. Furthermore, when the vacuum pump is ON and intake and exhaust gases are diverted from the intake runners and exhaust passages, ambient air may be drawn by the vacuum pump to an ambient air sample chamber with an ambient air gas composition sensor coupled thereto.

Next, method 800 continues at 840 where the gas compositions of the diverted intake gas at one or more of the intake sample chambers, the diverted exhaust gas at one or more of the exhaust sample chambers, and the ambient gas at the ambient gas sample chamber may be measured simultaneously by the gas composition sensors thereat. In other words, during a second condition when the vacuum pump is ON and when the gas composition of a first intake gas sample in a first of the intake sample chambers is being measured, the gas composition of a second first intake gas sample in a first of the intake sample chambers may be measured. Furthermore, during the second condition, the gas composition of a first exhaust gas sample in a first of the exhaust sample chambers may be measured. Further still, during the second condition, the gas composition of the ambient gas in the ambient gas sample chamber may be measured. In this way, a plurality of gas samples sampled from one or more of the intake runners, one or more of the exhaust passages, and the ambient air may be simultaneously measured. Each of the intake gas composition sensors, exhaust gas composition sensors, and ambient gas composition sensor may transmit signals to the controller 212.

At 850, the controller 212 may calculate estimates for the % EGR based on the measured intake gas composition, the measured exhaust gas composition, and the measured ambient gas composition. As described above with reference to equation (1), the controller 212 may calculate a % EGR delivered to a first intake runner based on the measured $CO_2$ compositions in the intake gas sample from the first intake runner, the exhaust gas sample corresponding to the exhaust passage fluidly coupled to the first intake runner, and the ambient air. Furthermore, for the case when intake gas compositions are measured for each of the intake runners and exhaust gas compositions are measured for each of the exhaust passages, the controller 212 may simultaneously calculate % EGR delivered to each of the intake runners based on the measured $CO_2$ compositions in the intake gas sample from each of the intake runners, each of the exhaust gas samples, and the ambient air. As such, the cylinder EGR distribution to each of the engine cylinders may be rapidly and easily determined following measurement of the intake, exhaust, and ambient gas compositions.

Next, at 860, method 800 continues by pumping the intake and exhaust sample gases from the respective intake and exhaust sample chambers to the system exhaust positioned downstream at a discharge side of the vacuum pump 210. As described above, the system exhaust may include a blower for mixing the exhaust with air, as well as emissions control devices such as particulate filters and the like for reducing emissions. Following 860, method 800 continues at 870 where the controller 212 determines if additional engine operating conditions may be tested. Because cylinder EGR distribution may vary over engine operating conditions such as EGR valve opening, engine temperature, engine load, engine manifold pressure, and the like, the cylinder EGR distribution measurement system 200 may be utilized to characterize the cylinder EGR distribution over a broad range of engine operating conditions. For the case where additional EGR test conditions are to be characterized, method 800 returns to 802 where the controller 212 sets the engine operation to the next set of operating conditions. In other words, responsive to selecting a new steady-state engine operating condition, the controller 212 sets the engine operating conditions to the next set of steady-state engine operating conditions. For the case where characterization of the cylinder EGR distribution over the desired range of engine operating conditions have been performed, method 800 ends.

The technical effect of fluidly coupling a vacuum pump of the cylinder EGR distribution measurement system to one or more intake runners of the engine is that transport delays for sampling gas from the cylinder intake runners to the gas composition sensors can be reduced. Furthermore, the technical effect of fluidly coupling a plurality of intake runners of the engine to the vacuum pump is that multiple engine cylinder intake runners may be sampled simultaneously, thereby reducing a duration for sampling and characterizing cylinder EGR distribution for the engine. Furthermore by utilizing ceramic gas composition sensor technology, measurement speed of the intake and/or exhaust and/or ambient air gas compositions can be increased significantly, allowing for near real-time gas composition measurements, and a reliability of the cylinder EGR distribution measurement system may be increased by reducing a number of moving parts. Further still, mounting the vacuum pump and the sample chambers with the gas composition sensors on a mobile base such as a cart allows for the cylinder EGR distribution measurement system to be easily transported by a single operator such that the cylinder EGR distribution for a plurality of engines may be characterized without moving the engines. Further still, a portable cylinder EGR distribution measurement may be independent of room capabilities and limitations, including characteristics such as room layout, utility and network communication ports, and the like.

As one embodiment, a method may include fluidly coupling a plurality of intake runners of an engine to a vacuum pump, diverting a portion of intake charge gas from the intake runner to a gas composition sensor with the vacuum pump, measuring an oxygen concentration of the diverted intake charge portion with the gas composition sensor, and estimating an EGR concentration of the intake charge based on the measured oxygen concentration. A first example of the method may optionally diverting intake charge gas from each of the plurality of intake runners to separate gas composition sensors with the vacuum pump, each of the separate gas composition sensors corresponding to one of the plurality of intake runners. A second example of the method may optionally include the first example, and further includes wherein diverting the intake charge gas from each of the intake runners to the separate gas composition sensors with the vacuum pump includes simultaneously diverting the intake charge gas from each of the intake runners to the separate gas composition sensors with the vacuum pump. A third example of the method optionally includes one or more of the first and second examples, and further includes wherein pressure drops between each of the plurality of intake runners and the corresponding separate gas composition sensor are equivalent. A fourth example of the method optionally includes one or more of the first through third examples, and further includes simultaneously measuring oxygen concentrations of each of the intake charges with the separate gas composition sensors. A fifth example of the method optionally includes one or more of the first through fourth examples, and further includes estimating EGR concentrations of each of the intake charges based on the measured oxygen concentrations of each of the intake charges. A sixth example of the method optionally includes one or more of the first through fifth examples, and further includes exhausting the diverted intake charge portion after measuring the oxygen concentration. A seventh example of the method optionally includes one or more of the first through sixth examples, and further includes positioning the vacuum pump and the separate gas composition sensors on a mobile base.

As one embodiment, an exhaust gas recirculation (EGR) measurement system may include an engine, including a plurality of intake runners, each fluidly coupled upstream from a separate engine cylinder, a vacuum pump fluidly coupled downstream to each of the plurality of intake runners, a plurality of gas composition sensors, each fluidly coupled downstream from a separate intake runner and upstream from the vacuum pump, and a controller. In such an example, the controller may include executable instructions stored in memory on-board the controller to, divert intake charge gas from each of the plurality of intake runners to one of the plurality of gas composition sensors, measure oxygen concentrations of diverted intake charge gas from each of the intake runners with the plurality of gas composition sensors, and estimate the EGR concentrations of each of the intake runners from the corresponding measured oxygen concentration of diverted intake charge gas. The system may additionally or alternatively comprise an exhaust gas composition sensor, wherein the vacuum pump is fluidly coupled to the exhaust gas composition sensor. In any of the preceding embodiments, the executable instructions to divert intake charge gas from each of the plurality of intake runners to one of the plurality of gas composition sensors may include diverting intake charge gas from each of the plurality of intake runners to one of the plurality of gas composition sensors responsive to the engine operating at steady-state. In some examples, the system may additionally or alternatively comprise executable instructions stored in memory on-board the controller to, divert engine exhaust gas to the exhaust gas composition sensor, and measure an exhaust gas oxygen concentration of the diverted engine exhaust with the exhaust gas composition sensor. In any of the preceding embodiments, the system may additionally or alternatively comprise a mobile cart, wherein the vacuum pump, the plurality of gas composition sensors, and the controller are positioned on the mobile cart. In any of the preceding embodiments, the system may additionally or alternatively include executable instructions stored in memory on-board the controller to, simultaneously, divert intake charge gas from each of the plurality of intake runners to the plurality of gas composition sensors, and divert engine exhaust gas to the exhaust gas composition sensor.

As one embodiment, a method for an engine, may include, during a first condition, including when a first intake gas is being drawn from a first intake runner and diverted from combustion cylinders of the engine to a first intake gas composition sensor with a vacuum pump, drawing a second intake gas from a second intake runner and diverting the second intake gas from engine combustion cylinders to a second intake gas composition sensor with the vacuum pump. In a first example, the method may optionally include, during a second condition, including when an oxygen concentration of the first intake gas is being measured with the first intake gas composition sensor, measuring an oxygen concentration of the second intake gas with the second intake gas composition sensor. A second example of the method optionally includes the first example and further includes, during the first condition, drawing an exhaust gas from the engine and diverting the exhaust gas to an exhaust gas composition sensor with the vacuum pump. A third example of the method optionally includes the first through second example and further includes, during the second condition, measuring an oxygen concentration of the exhaust gas with the exhaust gas composition sensor. A third example of the method optionally includes the first through second example and further includes, expelling the first intake gas, the second intake gas, and the exhaust gas from the vacuum pump. A third example of the method optionally includes the first through second example and further includes, during the first condition, drawing a third intake gas from a third intake runner and diverting the third intake gas from engine combustion cylinders to a third intake gas composition sensor with the vacuum pump, and during the second condition, measuring an oxygen concentration of the third intake gas with the third intake gas composition sensor.

In another representation, the method may include positioning the vacuum pump externally to the engine. In another representation, the method may include decoupling the vacuum pump from a first engine, moving the vacuum pump from being adjacent to the first engine to being adjacent to a second engine, and fluidly coupling the vacuum pump to the second engine, without changing a position of the first and second engines. In another representation, the method may include returning a portion of the measured intake sample and exhaust gases to an engine intake, including one or more of an intake passage and/or intake air passage upstream of an engine intake manifold. Additionally or alternatively, the method may include returning a portion of the measured intake sample and exhaust gases to an engine intake manifold. In another representation, the method may include positioning each of the plurality of intake sample chambers equidistant from its corresponding intake runner. In another representation, the method may include positioning each of the plurality of exhaust sample chambers equidistant from its corresponding exhaust passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
fluidly coupling a plurality of intake runners of an engine to a vacuum pump;
diverting a portion of intake charge gas with the vacuum pump to form a diverted intake charge gas flow from each of the plurality of intake runners to a gas composition sensor and then the vacuum pump;

measuring an oxygen concentration of the diverted intake charge gas portion with the gas composition sensor; and estimating an EGR concentration of the intake charge gas based on the measured oxygen concentration.

2. The method of claim 1, further comprising diverting intake charge gas from each of the plurality of intake runners to separate gas composition sensors with the vacuum pump, each of the separate gas composition sensors positioned between a corresponding one of the plurality of intake runners and the vacuum pump in the diverted intake charge gas flow.

3. The method of claim 2, wherein diverting the intake charge gas from each of the intake runners to the separate gas composition sensors with the vacuum pump includes simultaneously diverting the intake charge gas from each of the intake runners to the separate gas composition sensors with the vacuum pump.

4. The method of claim 2, wherein lengths of a plurality of gas lines vary such that pressure drops between each of the plurality of intake runners and the corresponding separate gas composition sensor are equivalent.

5. The method of claim 4, further comprising simultaneously measuring oxygen concentrations of diverted intake charge gas from each of the intake runners with the separate gas composition sensors.

6. The method of claim 5, further comprising estimating EGR concentrations of diverted intake charge gas from each of the intake runners based on the measured oxygen concentrations of each of the intake charges.

7. The method of claim 1, further comprising exhausting the diverted intake charge gas portion after measuring the oxygen concentration.

8. The method of claim 2, further comprising positioning the vacuum pump and the separate gas composition sensors on a mobile base.

9. An EGR measurement system, comprising:
an engine, including a plurality of intake runners, each fluidly coupled upstream from a separate engine cylinder;
a vacuum pump fluidly coupled downstream to each of the plurality of intake runners;
a plurality of gas composition sensors, each fluidly coupled downstream from a separate intake runner and upstream from the vacuum pump; and
a controller, including executable instructions stored in memory on-board the controller to,
divert intake charge gas from each of the plurality of intake runners to one of the plurality of gas composition sensors,
measure oxygen concentrations of the diverted intake charge gas from each of the intake runners with the plurality of gas composition sensors, and
estimate EGR concentrations of each of the intake runners from the corresponding measured oxygen concentration of the diverted intake charge gas.

10. The system of claim 9, further comprising an exhaust gas composition sensor, wherein the vacuum pump diverts exhaust gas from an exhaust passage to the exhaust gas composition sensor.

11. The system of claim 10, wherein the executable instructions to divert intake charge gas from each of the plurality of intake runners to one of the plurality of gas composition sensors include diverting intake charge gas from each of the plurality of intake runners to one of the plurality of gas composition sensors responsive to the engine operating at steady-state.

12. The system of claim 11, further comprising executable instructions stored in memory on-board the controller to;
divert engine exhaust gas to the exhaust gas composition sensor, and
measure an exhaust gas oxygen concentration of the diverted engine exhaust with the exhaust gas composition sensor.

13. The system of claim 10, further comprising a mobile cart, wherein the vacuum pump, the plurality of gas composition sensors, and the controller are positioned on the mobile cart.

14. The system of claim 10, further comprising executable instructions stored in memory on-board the controller to, simultaneously,
divert intake charge gas from each of the plurality of intake runners to the plurality of gas composition sensors, and
divert engine exhaust gas to the exhaust gas composition sensor.

15. A method for an engine, comprising, during a first condition, including when a first intake gas is being drawn from a first intake runner and diverted from combustion cylinders of the engine to a first intake gas composition sensor with a vacuum pump, where the first intake gas composition sensor is positioned in a flow of diverted first intake gas from the first intake runner to the vacuum pump;
drawing a second intake gas from a second intake runner and diverting the second intake gas from engine combustion cylinders to a second intake gas composition sensor with the vacuum pump, where the second intake gas composition sensor is positioned in a flow of diverted second intake gas from the second intake runner to the vacuum pump.

16. The method of claim 15, further comprising, during a second condition, including when an oxygen concentration of the first intake gas is being measured with the first intake gas composition sensor,
measuring an oxygen concentration of the second intake gas with the second intake gas composition sensor.

17. The method of claim 16, further comprising, during the first condition, drawing an exhaust gas from the engine and diverting the exhaust gas to an exhaust gas composition sensor with the vacuum pump.

18. The method of claim 17, further comprising, during the second condition, measuring an oxygen concentration of the exhaust gas with the exhaust gas composition sensor.

19. The method of claim 18, further comprising expelling the diverted first intake gas, the diverted second intake gas, and the diverted exhaust gas from the vacuum pump.

20. The method of claim 19, further comprising,
during the first condition, drawing a third intake gas from a third intake runner and diverting the third intake gas from engine combustion cylinders to a third intake gas composition sensor with the vacuum pump where third intake gas composition sensor is positioned in a flow of diverted third intake gas from the first intake runner to the vacuum pump, and
during the second condition, measuring an oxygen concentration of the third intake gas with the third intake gas composition sensor.

* * * * *